United States Patent [19]

Wallace et al.

[11] Patent Number: 4,556,551

[45] Date of Patent: Dec. 3, 1985

[54] HYDROGEN STORAGE MATERIALS OF ZIRCONIUM-CHROMIUM-IRON AND TITANIUM ALLOYS CHARACTERIZED BY $ZRCR_2$ STOICHIOMETRY

[75] Inventors: William E. Wallace; Faiz Pourarian, both of Pittsburgh, Pa.

[73] Assignee: Koppers Company, Inc., Pittsburgh, Pa.

[21] Appl. No.: 592,105

[22] Filed: Mar. 22, 1984

[51] Int. Cl.[4] .................. C01B 6/00; C22C 30/00
[52] U.S. Cl. ......................... 423/644; 420/428; 420/583; 420/900
[58] Field of Search .............. 423/644, 648 R; 420/900, 580, 581, 583, 428

[56] References Cited

U.S. PATENT DOCUMENTS 4,228,145 10/1980 Gamo et al. .................. 423/644
4,412,982 11/1983 Wallace et al. ............... 423/644

OTHER PUBLICATIONS

Shaltiel et al., "Hydrogen Absorption and Desorption Properties of $AB_2$ Laves-Phase Pseudobinary Compounds"; J. Less Comm. Metals 53:117–131 (1977).

Jacob et al., "Hydrogen Absorption in $(Zr_xTi_{1-x})B_2$ and the Phenomenological Model for the Absorption Capacity in Pseudo-Binary Laves-Phase Compounds" J. Less Comm. Metals 73 369–376 (1980).

Primary Examiner—Christopher W. Brody
Attorney, Agent, or Firm—Donald M. MacKay; Herbert J. Zeh, Jr.

[57] ABSTRACT

An alloy consisting of zirconium, chromium, iron and optionally titanium is characterized in having C14 hexagonal crystal structure and $ZrCr_2$ stoichiometry. Members of a preferred class of compounds, represented by the empirical formula $Zr_{1-x}Ti_xCr_{2-y}Fe_y$ wherein "x" has a value between 0.0 and 0.9 and "y" has a value of 0.1 to 1.5, are particularly suitable for use as hydrogen storage materials.

7 Claims, 8 Drawing Figures

HYDROGEN STORAGE MATERIALS OF ZIRCONIUM-CHROMIUM-IRON AND TITANIUM ALLOYS CHARACTERIZED BY ZRCR2 STOICHIOMETRY

BACKGROUND OF THE INVENTION

1. Field of the Invention

Many types of intermetallic compounds are known for use as hydrogen storage materials. Of particular interest herein are hydrogen storage materials provided by alloys of zirconium, chromium, iron and optionally titanium which are characterized by C14 hexagonal crystal structure and $ZrCr_2$ stoichiometry.

2. State of the Art

A material suitable for storage of hydrogen must satisfy many demanding criteria. In addition to large storage capacity for hydrogen, a hydride formed during hydrogen absorption by a material should have moderately low enthalpy characteristics; that is, the quantity of heat per mole of alloy required for formation of the hydride is preferably relatively low. Also, the hydrogen storage material should absorb and desorb hydrogen quickly, preferably at a pressure near one atmosphere and near room temperature, and the material should show a minimum of hysteresis effects during a hydrogen absorption/desorption cycle.

Intermetallic compounds which have received much attention for use as hydrogen storage materials are provided by derivatives of $ZrCr_2$ compounds, characterized by hexagonal C14 crystal structure and $AB_2$ stoichiometry. It is well known that the $ZrCr_2$ system is capable of absorbing copious quantities of hydrogen, but that hydrides formed from the $ZrCr_2$ system are too stable to be of practical significance. In search of improved $ZrCr_2$-based systems, alloys have been prepared which contain other elements substituted for all or a portion of the zirconium, but with the $AB_2$ stoichiometry maintained in the new alloy. For example, in Shaltiel et al., *J. Less. Comm. Metals*, 53, 117–131 (1977), there are described changes in the properties of $AB_2$ Laves-phase $ZrCr_2$-based compounds by substitution of chromium with a 3d transition metal in accordance with the empirical formula $Zr(Co_xM_{1-x})_2$ and $Zr(Fe_xM_{1-x})_2$ wherein $M = V$, Cr, Mn and x is between zero and one. Other studies of partial substitution of zirconium in $ZrCr_2$ alloys with titanium to form the hydrides of $Ti_{1-x}Zr_xCr_2$ pseudo-binaries are described in Jacob et al., *J. Less. Comm. Metals*, 73, (369–376) (1980).

SUMMARY OF THE INVENTION

Improved hydrogen storage materials are provided by an alloy consisting of zirconium, chromium, iron and optionally titanium, which alloy is characterized in having the C14 hexagonal crystal structure and $ZrCr_2$ stoichiometry. A representative family of such alloys may be expressed by the empirical formula $$Zr_{1-x}Ti_xCr_{2-y}Fe_y \quad (I)$$

wherein "x" has a value in a range from 0.0 to 0.9 and "y" has a value of 0.1 to 1.5, provided that when x is o, y is from 1.3 to 1.4, and when x is from 0.1 to 0.9, y is from 0.1 to 1.5. Alloys of particular interest within the scope of the formula I family of compounds are as follow:

$$ZrCr_{0.6}Fe_{1.4} \quad (II)$$
$$Zr_{0.8}Ti_{0.2}Cr_{0.6}Fe_{1.4}$$
$$Zr_{0.7}Ti_{0.3}Cr_{0.6}Fe_{1.4}$$
$$Zr_{0.8}Ti_{0.2}Cr_{0.7}Fe_{1.3}$$

Each of these specific alloys is characterized in having a desirable combination of properties. For example, the alloys have relatively low enthalpy as compared to many $ZrCr_2$-based systems. More significantly, it has been found that by partial replacement of zirconium with titanium and by partial replacement of chromium with iron in the $ZrCr_2$-based system, there is obtained a 700-fold increased in the hydrogen vapor pressure as compared to $ZrCr_2$, without a significant decrease in hydrogen capacity. Alloys of the invention are thus very useful in that the alloys have fairly constant absorption/desorption characteristics in a pressure range of about one to four atmospheres at about room temperature.

DESCRIPTION OF PREFERRED EMBODIMENTS

An alloy of the invention is characterized generally as a Laves-type intermetallic compound composed of zirconium, chromium, iron and optionally titanium in a C14 hexagonal crystal structure. The compound is further characterized in being a $ZrCr_2$-based alloy in which a portion of the zirconium may be replaced by titanium, and a portion of the chromium is replaced by iron, in a manner to maintain, substantially, the $ZrCr_2$ stoichiometry. The crystal structure is characterized by lattice parameters having approximate values in the following ranges:

$a = 4.97$ Å to $5.00$ Å

$c = 8.15$ Å to $8.20$ Å

A general procedure for preparation of these alloys follows. Weighed amounts of the zirconium, iron and optional titanium constituents are placed in a water cooled copper boat for heating to a fusing temperature. Heating is accomplished typically by means of an r.f. 450 KHz induction heater. The copper boat is mounted inside a vacuum-tight quartz tube through which a stream of Ti-gettered argon passes during the heating period. Fusing of the first three constituents takes place by heating a mixture of these constituents to about 1600° C. in about two minutes, and holding at that temperature for about two minutes. Then the sample is cooled to room temperature in a period of about one minute and the hardened sample is turned over in the boat. Melting cooling are repeated through four cycles, typically. After two melting/cooling cycles, the sample is weighed for determination of weight loss, which typically is negligible. Then a desired amount of chromium is added to the fused zirconium-iron or titanium-iron sample. The sample is then melted twice again. Usually, the actual chromium content of a sample can be controlled to within ±0.1 percent of the theoretical amount. Then the sample is annealed for a period of about two hours at about 1100° C. X-ray diffraction analysis of the annealed sample typically shows a material consisting of a single phase.

In order to activate the sample to make it suitable as a hydrogen storage material, about two grams of the annealed sample is placed in a stainless-steel pressure reactor vessel suitable for use in forming a hydride of the sample. The reactor is evacuated to a pressure of about $10^{-3}$ Torr. Then pure hydrogen is pumped into the reactor to a pressure of about 40 to 50 atm., with the reactor vessel temperature initially at about 25° C., until hydrogen is no longer absorbed by the sample. Usually, within two minutes of the time hydrogen is initially introduced into the reactor, the reaction vessel temperature increases to about 50° C. Then the reactor is allowed to cool to room temperature over a period of about 30 minutes, after which time the pressure within the reactor is usually about 45 atm. The pressure in the reactor is reduced to ambient, and then the sample is subjected to a pressure of about $10^{-3}$ Torr for about 20 minutes in order for the sample to desorb sutstantially all of the previously-absorbed hydrogen. Portions of the hydrogen were removed from the specimen, and the pressure was recorded for the composition corresponding to the hydrogen remaining in the metal. The concentrations were established employing the gas law with appropriate corrections. Equilibrium was reached within a few minutes; however, the hydrogen pressure was recorded only after it had remained constant for ~5 h. The PCI's were determined for temperatures between 23° to approximately 150° C. Care was taken in each sequence of experiments to stablilize the temperature of the sample after removal or addition of hydrogen. This is important for reliable determinations of the PCI's and the acquisition of accurate results for the heats and entropies of dissociation. The hydrogen capacity values ($H_n$) were determined at 23° C. and ~10 and ~40 atm., for all the examples.

In order to obtain a fully-activated hydrogen storage material, the sample is subjected to about 25 absorption-desorption cycles, under conditions as described for the activation procedure above. At the end of this activating period, there is obtained a repeatable pressure-composition profile. To obtain crystal structure data on the hydrides, a portion of the activated sample is hydrogenated to a known composition in accordance with the previously-established pressure-composition isotherm. Then the hydrogenated sample is cooled quickly by quenching the sample boat (reactor) in liquid nitrogen, and rapidly pumping away remaining gaseous hydrogen. In accordance with the technique of Gualtieri et al., [*J. Appl. Phys.*, 47, 3432 (1976)], a few Torr of $S_{O2}$ is admitted to the reaction vessel to poison the surface of the sample and thereby seal in the hydrogen. After the sample warms to room temperature, X-ray diffraction data is obtained for the sample.

In order to demonstrate the preparation of the alloys of the invention and their hydrides, and to obtain data as to characteristics and properties of the alloys, three quaternary and one ternary alloy containing varying amounts of the four constituent elements were actually prepared in accordance with the aforementioned, generally-described procedures. Essential parameters such as constituent weights, melting and annealing temperatures, lattice parameters and hydriding characteristics were summarized in Tables I–II. Each of the constitutents was 99.9 percent pure and was used as obtained from Alfa Products, Ventron Div., Danvers, MA.

TABLE I

Preparation of $Zr_{1-x}Ti_xCr_{2-y}Fe_y$ Alloys

| Sample No. | Alloy | Amount of Each Constituent (gm) | | | | Melting Temp (°C.) | Heat Treatment | | | |
|---|---|---|---|---|---|---|---|---|---|---|
| | | Zr | Ti | Cr | Fe | | Melting Cycles | | Annealing | |
| | | | | | | | No. | Melt Period (Min) | Temp (°C.) | Period (Hrs) |
| I | $ZrCr_{0.6}Fe_{1.4}$ | 1.866 | — | 0.638 | 1.599 | ~1500 | 6 | 2 | 1100 | 3 |
| II | $Zr_{0.8}Ti_{0.2}Cr_{0.6}Fe_{1.4}$ | 1.510 | 0.198 | 0.645 | 1.617 | ~1500 | 6 | 2 | 1100 | 3 |
| III | $Zr_{0.7}Ti_{0.3}Cr_{0.6}Fe_{1.4}$ | 1.520 | 0.342 | 0.742 | 1.861 | ~1500 | 6 | 2 | 1100 | 3 |
| IV | $Zr_{0.8}Ti_{0.2}Cr_{0.7}Fe_{1.3}$ | 1.508 | 0.198 | 0.752 | 1.500 | ~1500 | 6 | 2 | 1100 | 3 |

TABLE II

Lattice Parameters and Hydrogen Absorption for $Zr_{1-x}Ti_xCr_{2-y}Fe_y$ Alloys

| Sample No. | Alloy Alloy Hydride | Lattice Parameters | | Unit Cell Volume | Hydrogen Storage Capacity ml $H_2$ per gm alloy | |
|---|---|---|---|---|---|---|
| | | a(Å) | c(Å) | V (Å)$^3$ | @ 10 atm | @ 40 atm |
| I | $ZrCr_{0.6}Fe_{1.4}$ | 5.006 | 8.196 | 178.0 | 169 | 188 |
| | $ZrCr_{0.6}Fe_{1.4}H_{3.1}$ | 5.327 | 8.701 | 214.0 | | |
| II | $Zr_{0.8}Ti_{0.2}Cr_{0.6}Fe_{1.4}$ | 4.981 | 5.318 | 175.0 | 158 | 188 |
| | $Zr_{0.8}Ti_{0.2}Cr_{0.6}Fe_{1.4}H_{3.0}$ | 5.318 | 8.667 | 212.3 | | |
| III | $Zr_{0.7}Ti_{0.3}Cr_{0.6}Fe_{1.4}$ | 4.970 | 8.173 | 174 | 113 | 175 |

TABLE II-continued

| | | Lattice Parameters and Hydrogen Absorption for $Zr_{1-x}Ti_xCr_{2-y}Fe_y$ Alloys | | | | |
|---|---|---|---|---|---|---|
| | | Lattice Parameters | | Unit Cell Volume | Hydrogen Storage Capacity ml $H_2$ per gm alloy | |
| Sample No. | Alloy Alloy Hydride | a(Å) | c(Å) | V (Å)³ | @ 10 atm | @ 40 atm |
| IV | $Zr_{0.7}Ti_{0.3}Cr_{0.6}Fe_{1.4}H_{2.7}$ | 5.310 | 8.656 | 211.3 | | |
| | $Zr_{0.8}Ti_{0.2}Cr_{0.7}Fe_{1.3}$ | 4.991 | 8.174 | 176.3 | 155 | 187 |
| | $Zr_{0.8}Ti_{0.2}Cr_{0.7}Fe_{1.3}H_{2.95}$ | 5.299 | 8.699 | 211.6 | | |

Figure 1:
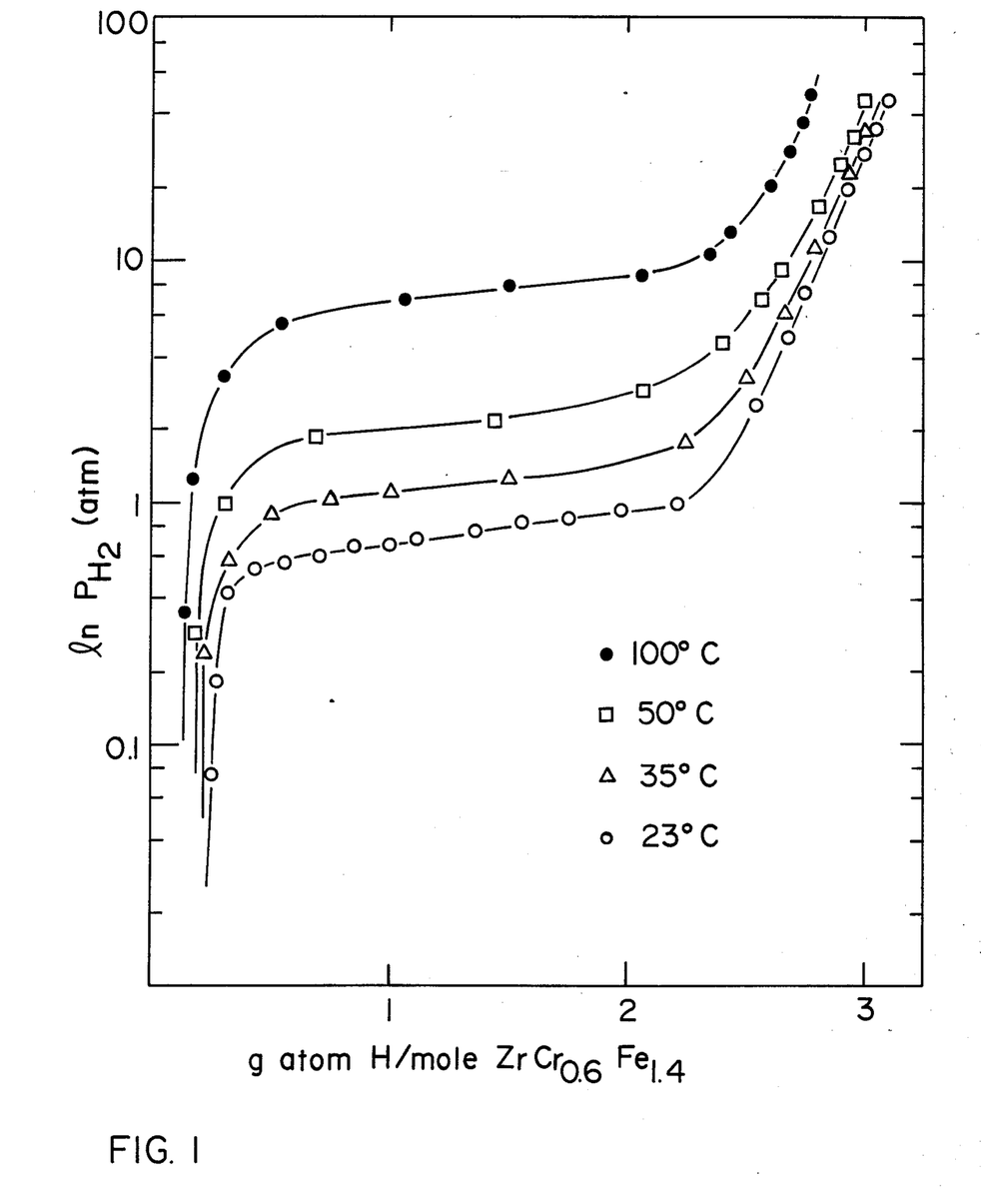
FIG. 1 is an equilibrium pressure-composition isotherm for the system $ZrCr_{0.6}Fe_{1.4}$-$H_2$, which is a representative ternary alloy hydride of the invention.
Figure 2:
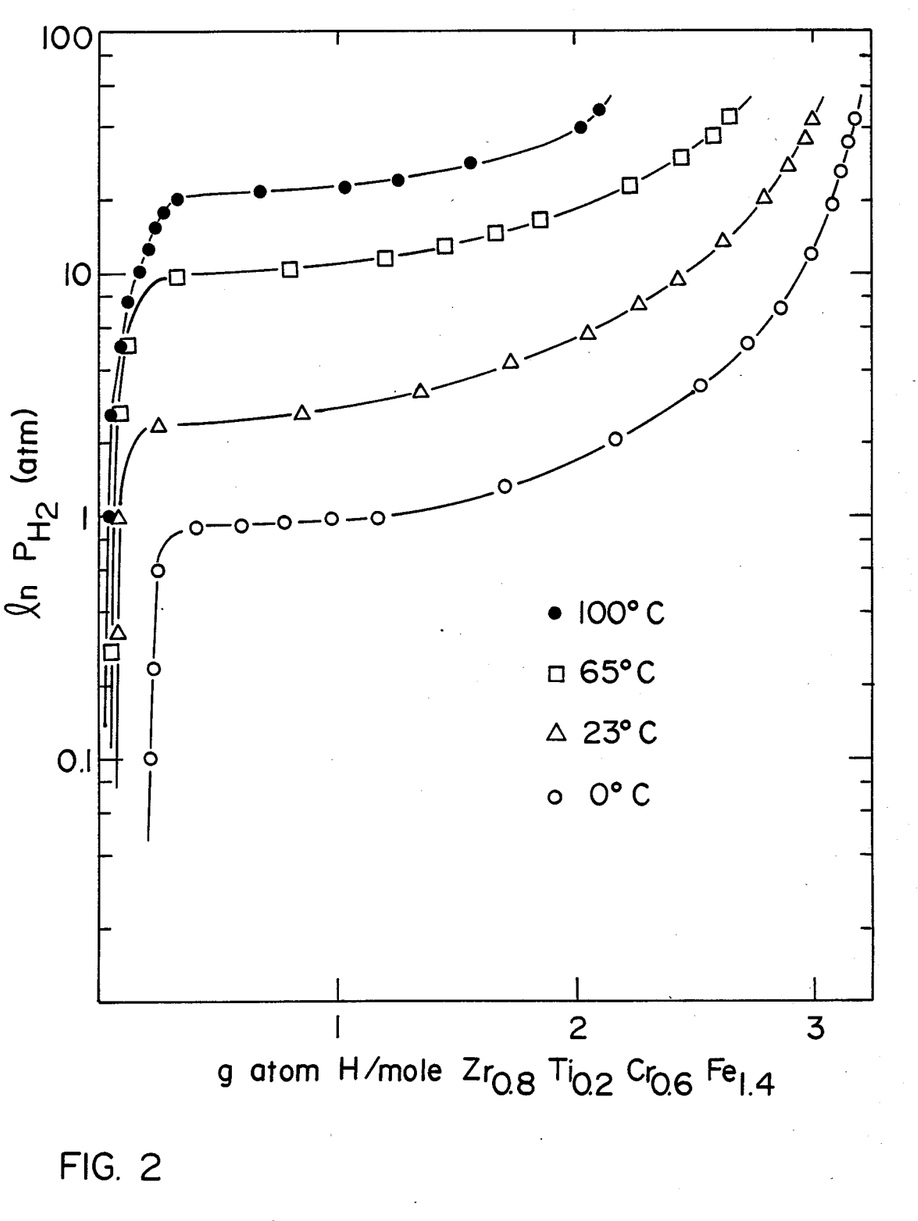
FIG. 2 is an equilibrium pressure-composition isotherm for the system $Zr_{0.8}Ti_{0.2}Cr_{0.6}Fe_{1.4}$-$H_2$, which is a representative quaternary alloy hydride of the invention.
Figure 3:
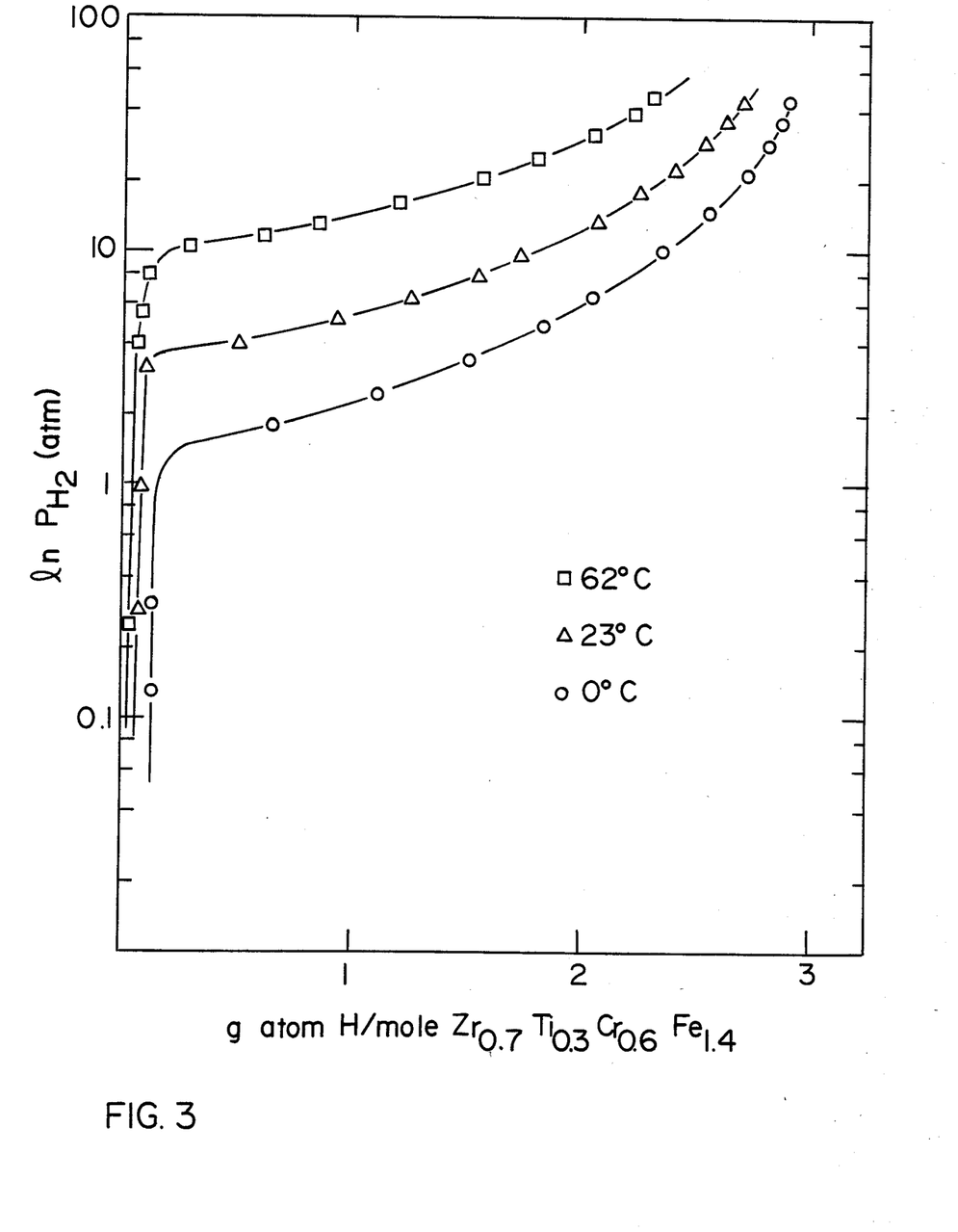
FIG. 3 is an equilibrium pressure-composition isotherm for the system $Zr_{0.7}Ti_{0.3}Cr_{0.6}Fe_{1.4}$-$H_2$, which is another representative quaternary alloy of the invention.
Figure 4:
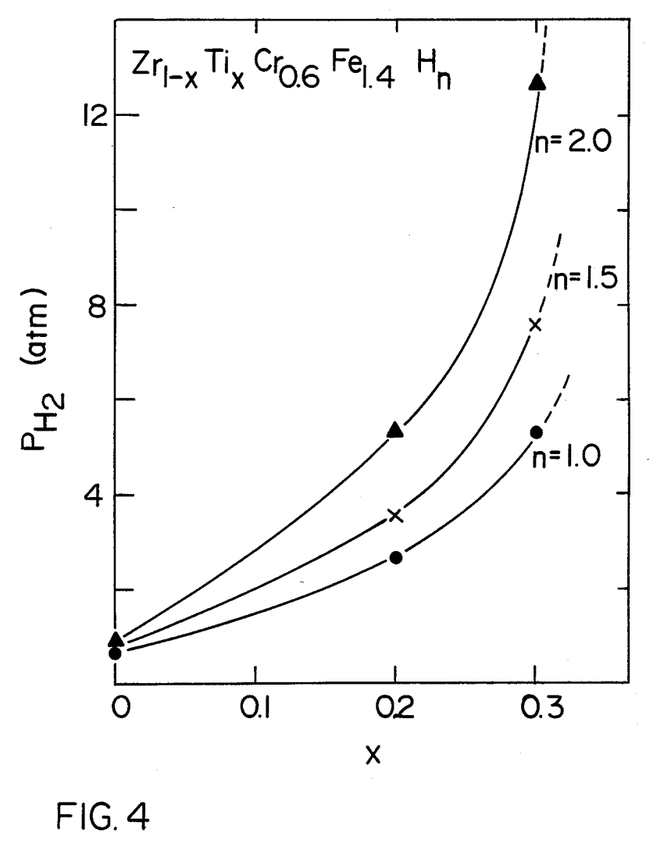
FIG. 4 depicts the plot of the variation of the decomposition pressure versus the titanium content at hydride concentrations where $n = 1.0$, 1.5 and 2.0, for the system $Zr_{1-x}Ti_xCr_{0.6}Fe_{1.4}H_n$ at room temperature.

The pressure-composition isotherms of FIGS. 1–3 are associated with three representative embodiments of the zirconium-chromium-iron and zirconium-titanium-chromium-iron alloy systems of the invention and demonstrate important advantages of this system. For example, at about room temperature the two quaternary alloy systems can be hydrogenated and dehydrogenated at hydrogen pressures of about one atm. Also, the ternary alloy system absorbs and desorbs hydrogen at a fairly constant pressure over a wide range of hydrogen concentrations, namely, from about 0.5 to about 2.0 gram-atom of hydrogen per mole of alloy at 35° C.

Figure 5:
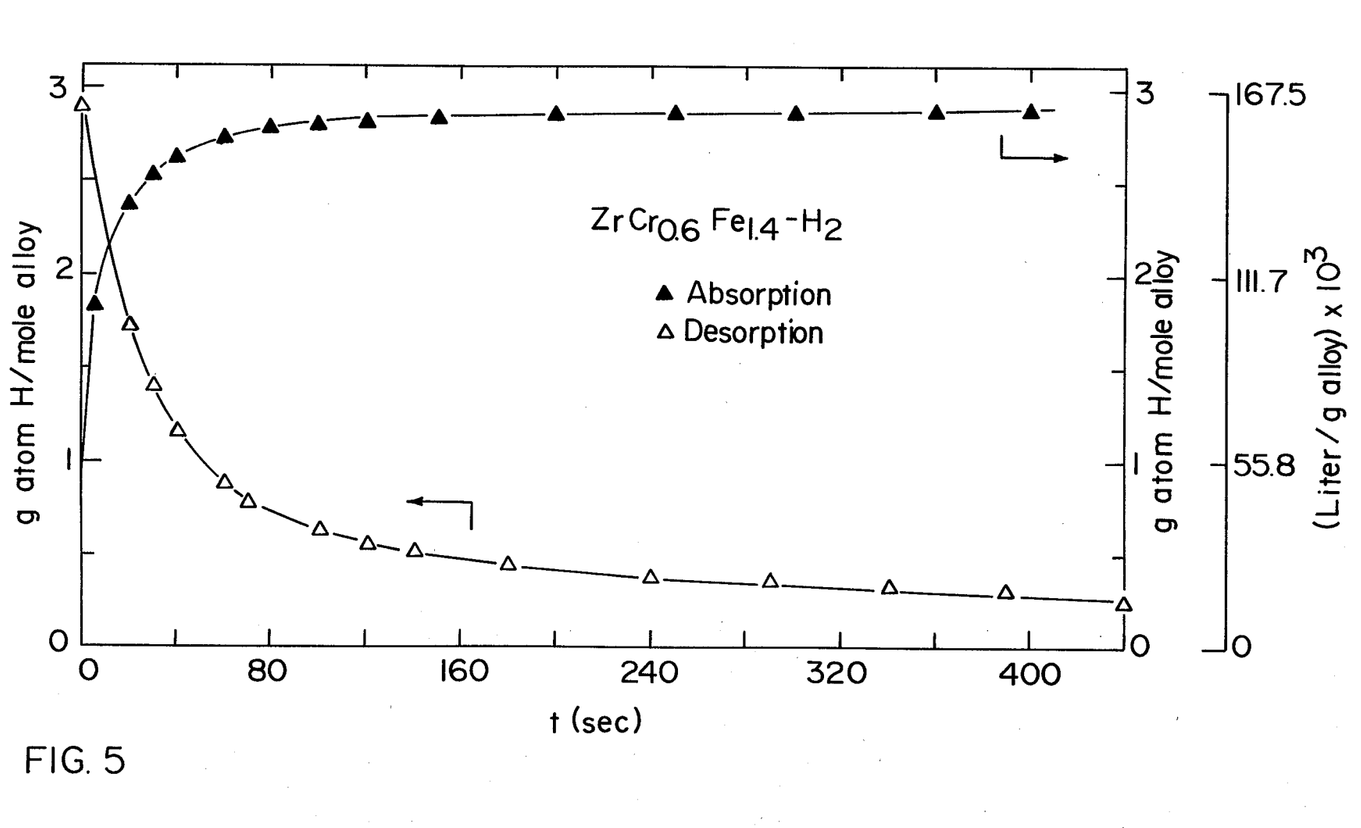
FIG. 5 depicts the plots of the rates of absorption and desorption, respectively, of hydrogen by the system $ZrCr_{0.6}Fe_{1.4}$-$H_2$ at 40° C.
Figure 6:
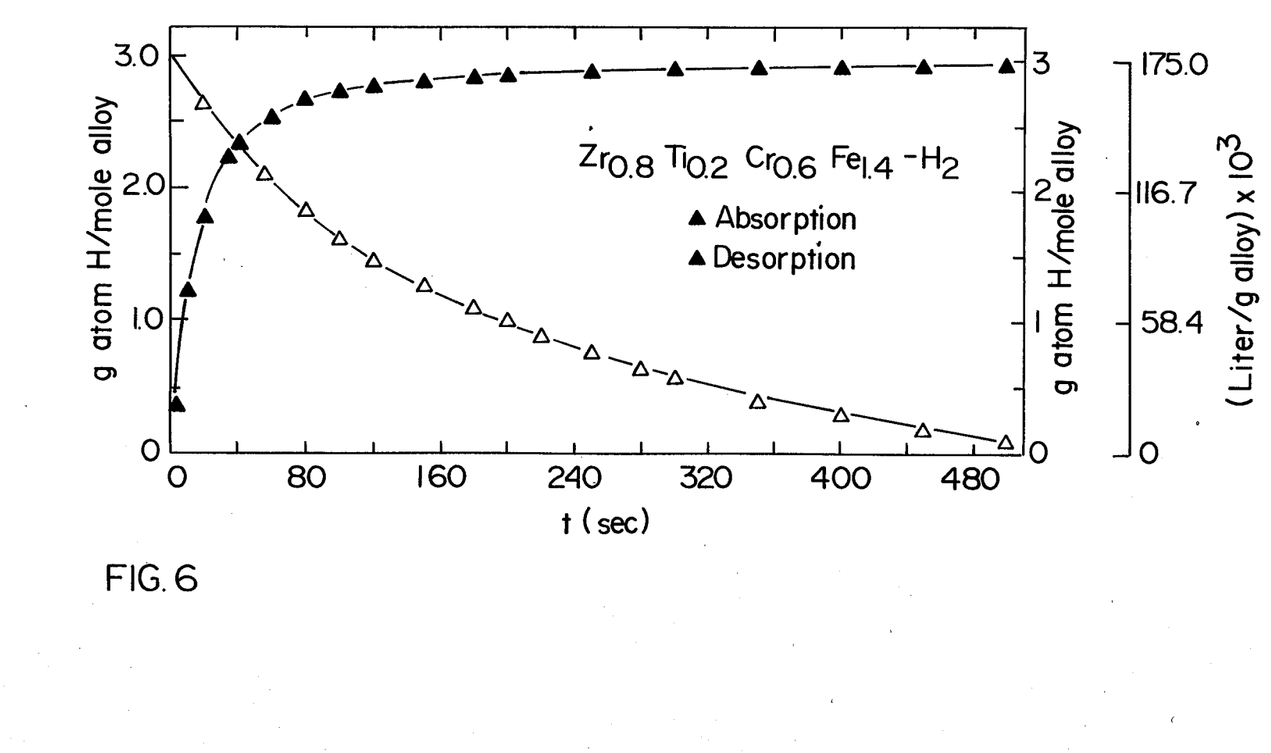
FIG. 6 depicts the plots of the rates of absorption and desorption respectively, of hydrogen by the system $Zr_{0.8}Ti_{0.2}Cr_{0.6}Fe_{1.4}$-$H_2$ at 23° C.
Figure 7:
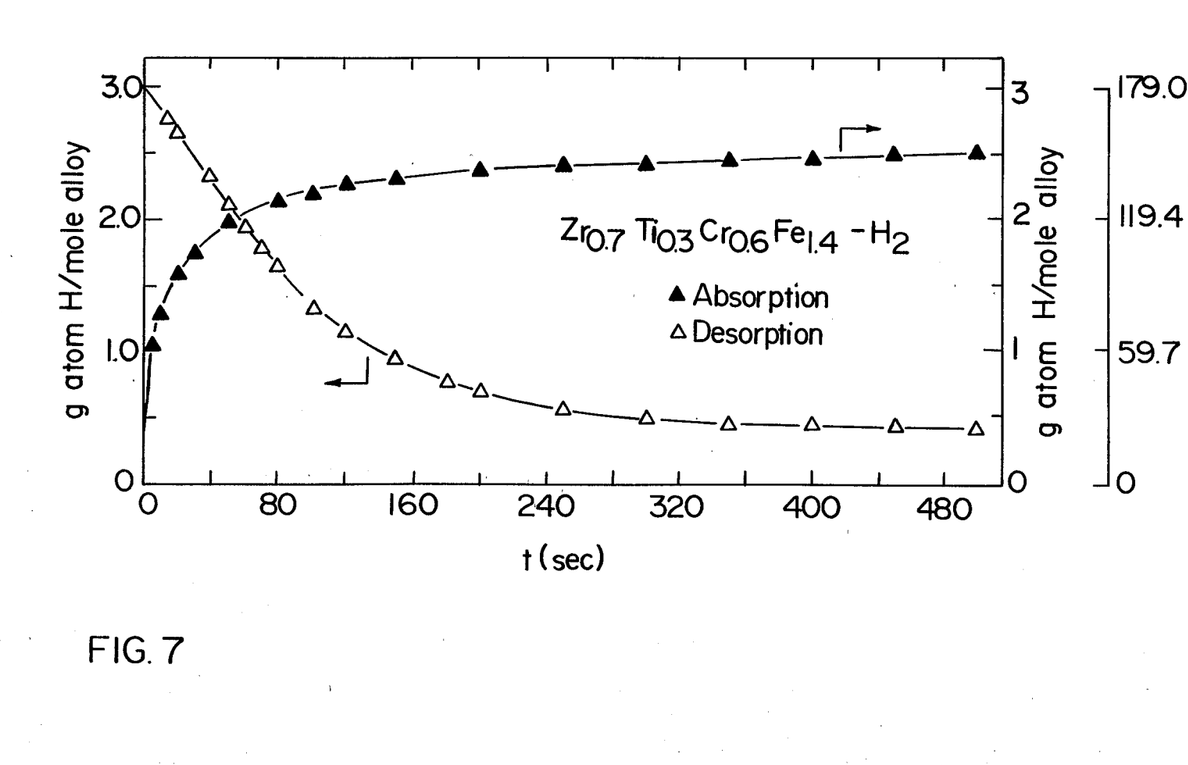
FIG. 7 depicts the plots of the rates of absorption and desorption respectively, of hydrogen by the system $Zr_{0.7}Ti_{0.3}Cr_{0.6}Fe_{1.4}$-$H_2$ at 23° C.

The alloys of the invention are also characterized by fairly rapid absorption/desorption of hydrogen. As shown in FIGS. 5, 6 and 7, a condition of 90 percent complete absorption of hydrogen can be obtained in less than about 60 seconds.

Figure 8:
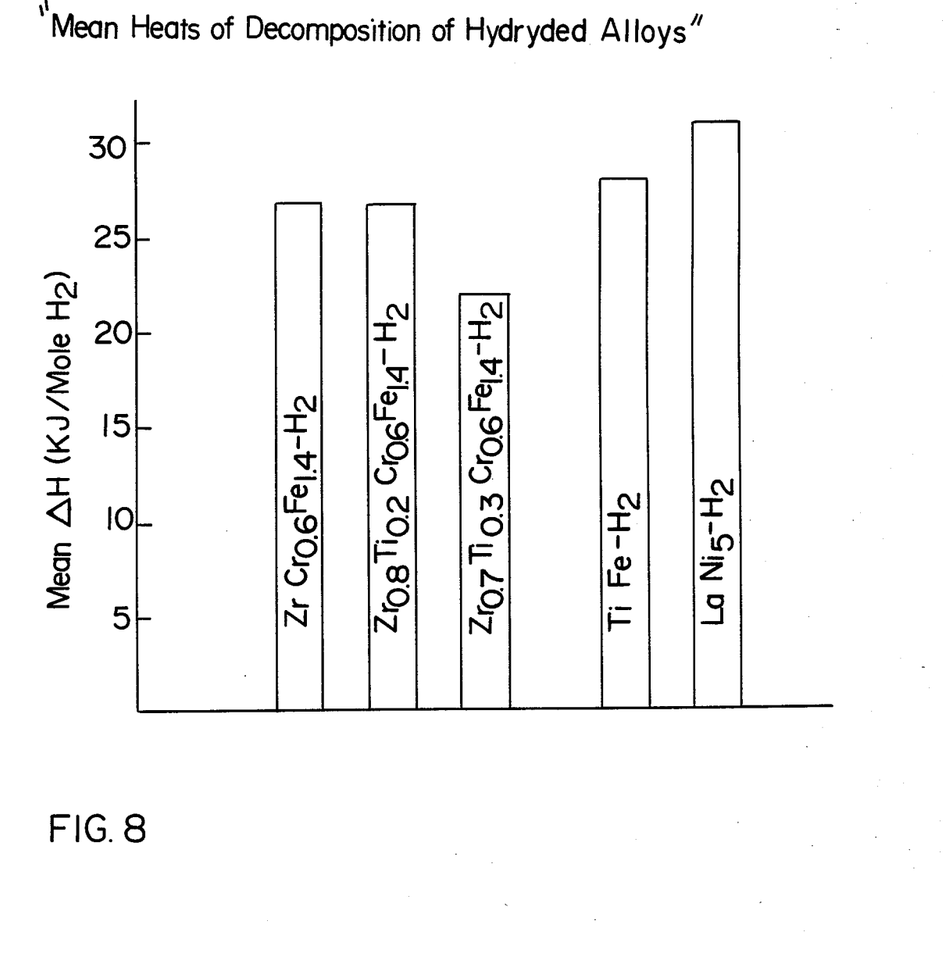
FIG. 8 is a comparison of mean enthalpies of the systems $Zr_{1-x}Ti_xCr_{0.6}Fe_{1.4}$-$H_2$ (x=0.0, 0.2 and 0.3).

The alloys of the invention have relatively low enthalpy ($\Delta H$) as compared to conventional $LaNi_5$ hydride and $CaNi_5$ hydride systems as shown in FIG. 8. The small value of $\Delta H$ is significant in regard to the exploitation of hydrogen as a fuel. As the heat absorbed in the release of hydrogen is smaller, the fuel value of the hydrogen stored in the hydride is correspondingly enhanced since less heat must be allocated to effect the endothermal release of hydrogen from the hydride. The small value of $\Delta H$ has the additional advantage in that heat flow demands are reduced. This could be a significant factor in large-scale applications involving massive hydride beds since such beds have poor thermal conductivity characteristics.

Although specific examples of the invention have been set forth hereinabove, it is not intended that the invention be limited solely thereto, but is to include all the variations and modifications falling within the scope of the appended claims.

What is claimed is:

1. An alloy of elements expressed by the following formula $$Zr_{1-x}Ti_xCr_{2-y}Fe_y$$

wherein "x" has a value between 0.2 and 0.3 and "y" has a value of 0.1 to 1.5, and their hydrides.

2. The alloy of claim 1 wherein "x" has a value of 0.2 and "y" has a value of 1.4.

3. The alloy of claim 1 wherein "x" has a value of 0.3 and "y" has a value of 1.4.

4. The alloy of claim 1 wherein "x" has a value of 0.2 and "y" has a value of 1.3.

5. The hydride of claim 1 of the alloy $Zr_{0.8}Ti_{0.2}Cr_{0.6}Fe_{1.4}$.

6. The hydride of claim 1 of the alloy $Zr_{0.7}Ti_{0.3}Cr_{0.6}Fe_{1.4}$.

7. The hydride of claim 1 of the alloy $Zr_{0.8}Ti_{0.2}Cr_{0.7}Fe_{1.3}$.

* * * * *